Patented Jan. 19, 1954

2,666,795

UNITED STATES PATENT OFFICE 2,666,795

METHOD FOR THE PREPARATION OF UNSATURATED PRIMARY AROMATIC ALCOHOLS

Thomas R. Steadman, Akron, Ohio, assignor to The B. F. Goodrich Company, New York, N. Y., a corporation of New York No Drawing. Application June 1, 1950, Serial No. 165,575

9 Claims. (Cl. 260—618)

This invention relates to a method for the preparation of unsaturated primary alcohols containing aromatic substitution and pertains more particularly to the preparation of such alcohols by the reaction of alpha-alkyl substituted styrenes with formaldehyde.

It is known that aliphatic dibasic acid esters of certain primary alcohols, which alcohols contain an aromatic substituent, are useful as plasticizers for synthetic resins. However, due to the fact that such alcohols have been obtainable heretofore only with great difficulty and/or from relatively costly raw materials, esters of these alcohols have not been utilized to any great extent as plasticizers.

Accordingly, it is an object of this invention to provide a method whereby unsaturated alcohols containing an aromatic substituent are obtained economically and in high yields, which alcohols can then be readily hydrogenated to the more desired saturated form. A second object is to prepare unsaturated alcohols containing an aromatic substituent, which alcohols can be readily hydrogenated and utilized in the preparation of esters useful as plasticizers for synthetic resins. A third object is to prepare unsaturated alcohols which are useful as chemical intermediates in the preparation of esters, amides and other chemical compounds. Other objects of the invention will be apparent from the description which follows.

It has now been discovered that the above and other objects are readily accomplished by reacting alpha-alkyl styrenes of the formula

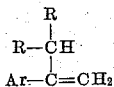

wherein Ar is an aromatic radical composed of a single ring structure and in which all the hydrogen atoms are attached to carbon atoms, and each R is selected from the class consisting of hydrogen and lower alkyl radicals, with formaldehyde, either alone or in the presence of an organic acid or anhydride which functions as a reactive solvent. It is preferred that an organic acid be utilized since highest yields of product are thereby secured. Acetic acid is most desirably used, but propionic acid, n-butyric acid, isobutyric acid and the like may also be employed. Inorganic acids such as sulfuric acid and the like do not function as reactive solvents in this reaction, and in fact, the process is desirably carried out in the absence of such acids. The reaction is also desirably carried out in the absence of other materials which influence condensation reactions particularly acidic inorganic condensation catalysts such as zinc and aluminum chloride. In this manner there are obtained in excellent yields unsaturated primary alcohols having an aromatic substituent (or a mixture of the unsaturated alcohol and the corresponding ester when the reaction is carried out in the presence of an acid or anhydride). The alcohols and esters thus prepared are readily hydrogenated to the corresponding saturated compounds which are especially useful in the preparation of plasticizers for synthetic resins. The reaction of the present invention may be represented by the following equation:

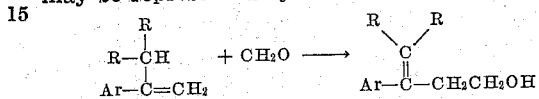

wherein Ar and R have the significance given above. This reaction represents a condensation between a hydrogen atom alpha to a carbon to carbon double bond and formaldehyde.

Among the alpha-alkyl styrenes which may be reacted with formaldehyde in accordance with the present invention are included alpha-methyl styrene, alpha-ethyl styrene, alpha-butyl styrene, para-chloro-alpha-methyl styrene, para-bromo-alpha-ethyl styrene, 2,4-dichloro-alpha-methyl styrene, 2,5-dichloro-alpha-methyl styrene, para-methoxy-alpha-ethyl styrene, 2,5 - dimethoxy-alpha-methyl styrene and the like. It is to be understood that the above compounds represent but a few of the alpha-alkyl styrenes which may be utilized. The preferred compounds of this class are those in which Ar is a phenyl radical, and in which each R represents a hydrogen atom or in which one R represents hydrogen and the other R is an alkyl radical containing from 1 to 3 carbon atoms, and accordingly a preferred embodiment of the invention comprises reacting alpha-methyl styrene, alpha-ethyl styrene, alpha-propyl styrene or alpha-butyl styrene with formaldehyde.

Paraformaldehyde is the preferred source of formaldehyde for the reaction of this invention, but gaseous formaldehyde, alpha-polyoxymethylene, or any other substance which decomposes to yield formaldehyde under the particular reaction conditions may also be used. In addition, commercial formalin may be employed but the reaction does not proceed to as great an extent as when substantially anhydrous reactants are charged.

The quantities of reactants used are not critical and may be varied considerably. For example, equimolecular quantities of the alpha-alkyl styrene, formaldehyde and organic acid (if an acid is employed), or a molecular excess of any of them may be used. Preferably, however, the number of moles of the organic acid, if any, is 0.5 to 7.0 times that of the formaldehyde, and the number of moles of alpha-alkyl styrene 1 to 4 times that of the formaldehyde, highest yields generally being secured with a formaldehyde-alpha-alkyl styrene-organic acid ratio of 1:3:0.7 or 1:2:1.

It is preferred that the reaction be carried out under pressures greater than atmospheric as by conducting the reaction in a copper autoclave or other pressure reaction apparatus where pressures at least equal to the vapor pressure of the reactants at the reaction temperature are developed. However, in some cases, as when high boiling alpha-alkyl styrenes are used, the reaction may be conducted in an open reaction vessel equipped with a reflux condenser.

The reaction temperature varies with the reactivity of the alpha-alkyl styrene employed. In general, however, temperatures above room temperature, ordinarily from 80° C. to 250° C. are operative, and the reaction time varies from 1 to 30 hours. Thus, for example, when paraformaldehyde, alpha-methyl styrene and acetic acid are used, highest yields of desired product are obtained by heating the reaction mixture at about 175° C. for a period of approximately 8 to 25 hours.

The reaction of this invention is best carried out by admixing the alpha-alkyl styrene, formaldehyde (or formaldehyde producing substance), and the organic acid, if any, in a copper reaction bomb or copper autoclave excluding inorganic acids from the reaction mixture. This mixture is then heated to the reaction temperature until the reaction is substantially complete. It is also desirable to agitate the reaction mixture for an hour or more to insure complete mixing of the reactants. During the reaction, pressures up to 300 p. s. i. are developed within the reaction chamber. After the reaction is complete, the unsaturated alcohol and the corresponding ester, if any, are separated from the reaction mixture in any convenient manner as by fractional distillation at reduced pressure, or by extracting the reaction mixture with a water-immiscible organic solvent, separating the resulting solution containing the organic products from the aqueous layer, and then distilling the extracted products. The principal fraction obtained when no acid is used is the desired unsaturated alcohol, but forefractions containing unreacted alpha-alkyl styrene, which may be recycled, as well as a high-boiling product, are also obtained. Of course, when an acid or anhydride is utilized as a reactive solvent, a fraction composed of the ester of the unsaturated alcohol is also obtained.

A variation in the above procedure involves the use of a mixture of an acid and an anhydride as the reactive solvent, the anhydride removing the water formed in the condensation reaction and giving a substantially water-free product. It has also been found desirable to include an inhibitor such as trinitrobenzene, pyrogallol or the like in the reaction mixture in order to prevent substantial polymerization of the alpha-alkyl styrene during the course of the reaction.

The following specific examples will serve to illustrate the preparation of unsaturated alcohols and acetates by the reaction of this invention, but are not intended to limit the invention, for there are, of course, numerous possible variations and modifications. In the examples all parts are by weight.

EXAMPLE I

A stainless steel rocking autoclave is charged with 1429 parts (12 moles) of alpha-methyl styrene, 120 parts (4 moles) of paraformaldeyhde and 7.15 parts (0.5% based on the alpha-methyl styrene) of trinitrobenzene. The reactants are then heated for 22.5 hours at 175° C. after which the reaction mixture is distilled at reduced pressure to give 243 parts (41%) of 3-phenyl-3-butenol-1. (B. P. 141°–151° C./26 mm.; $n_d^2=1.5520$, $d_4^{25}=1.033$).

EXAMPLE II

The following reactants are heated for 24 hours at 165° C. in a copper lined autoclave:

45 parts (1.5 moles) paraformaldehyde
60 parts (1.0 mole) acetic acid
51 parts (0.5 mole) acetic anhydride
354 parts (3.0 moles) alpha-methyl styrene The reaction mixture is then diluted with benzene, washed, dried and vacuum distilled to give 165 parts of a product with a boiling point of 121°–133° C./10 mm. By saponification it is determined that the product consists of 1 part of 3-phenyl-3-butenol-1 and 3 parts of the corresponding acetate. Therefore the yield is 64%.

EXAMPLE III

The procedure of Example II is repeated except the formaldehyde is pumped into a mixture of alpha-methyl styrene, acetic acid, trinitrobenzene and the copper turnings. A good yield of the desired product is obtained although the yield is not as high as that obtained in Example II.

EXAMPLE IV

A mixture of 280 parts (1.5 moles) of 3,4-dichloro-alpha-methyl styrene, 15 parts (0.5 mole) paraformaldehyde, 90 parts (1.5 moles) of acetic acid and 0.28 part of trinitrobenzene are heated in a copper lined autoclave for 23 hours at 150°–160° C. The reaction mixture is then diluted with ether and dried over anhydrous sodium sulfate; the ether is next removed and the reaction mixture fractionated at reduced pressure and in the presence of 3 parts of phenyl beta-naphthyl amine. The first fraction consists of unreacted 3,4-dichloro-alpha-methyl styrene (B. P. 80–82° C./2.2 mm.). The second fraction 69.5 parts of a yellow oil (B. P. 135° C./1 mm.) is a mixture of 3-(3,4-dichlorophenyl)-3-butenyl acetate and 3-(3,4-dichlorophenyl)-3-butenol-1.

Similarly, when the above examples are repeated utilizing other of the alpha-alkyl styrenes disclosed hereinabove, or varying the reaction conditions shown in the examples the desired unsaturated alcohol is again obtained in excellent yield.

As has been disclosed hereinabove, the unsaturated alcohols and esters obtained by the process of this invention are readily hydrogenated. For example, when 39 parts of 3-phenyl-3-butenol-1 are placed in a hydrogenation apparatus together with 3.5 parts of a Raney nickel catalyst and hydrogen is introduced into the apparatus at a pressure of 50 p. s. i. for 2.5 hours the theoretical quantity of hydrogen is absorbed. Upon distillation of the hydrogenation mixture, 31.6 parts of 3-phenylbutanol are obtained. Esters of 3-phenylbutanol with dibasic acids are eminently suited for use as plasticizers for synthetic resins.

Although specific examples of the invention have been herein described, it is not intended to limit the invention solely thereto, but to include all of the variations and modifications falling within the spirit and scope of the appended claims.

I claim:

1. The method which comprises reacting formaldehyde with a compound of the formula

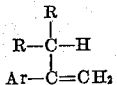

wherein Ar is an aromatic radical composed of a single ring structure and in which all the hydrogen atoms are attached to carbon atoms, and each R is selected from the class consisting of hydrogen and lower alkyl radicals having from 1 to 3 carbon atoms, at a temperature of from about 80° C. to about 250° C., thereby to obtain a compound of the formula

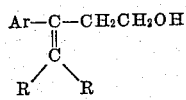

wherein Ar and R have the significance given above.

2. The method which comprises reacting formaldehyde with a compound of the formula

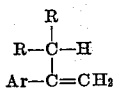

wherein Ar is an aromatic radical composed of a single ring structure and in which all the hydrogen atoms are attached to carbon atoms, and each R is selected from the class consisting of hydrogen atoms and lower alkyl radicals having from 1 to 3 carbon atoms, at a temperature of from about 80° C. to about 250° C., in the presence of acetic acid, thereby to obtain both a compound of the formula

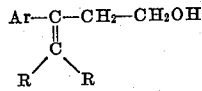

wherein Ar and R have the significance given above, and the acetate of said compound.

3. The method which comprises reacting formaldehyde with a compound of the formula

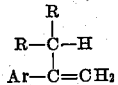

wherein Ar is an aromatic radical composed of a single ring structure and in which all the hydrogen atoms are attached to carbon atoms, and each R is selected from the class consisting of hydrogen atoms and lower alkyl radicals having from 1 to 3 carbon atoms, in the presence of a compound selected from the class consisting of acetic acid and acetic acid anhydride and at a temperature of from 80° C. to 250° C., thereby to obtain both a compound of the formula

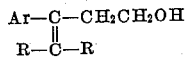

wherein Ar and R have the significance given above, and the acetate of said compound.

4. The method which comprises reacting formaldehyde with a compound of the formula

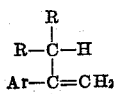

wherein Ar is a phenyl radical and each R is selected from the class consisting of hydrogen and lower alkyl radicals having from 1 to 3 carbon atoms in the presence of acetic acid and at a temperature of from 80° C. to 250° C. thereby to obtain both a compound of the formula

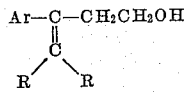

wherein Ar and R have the significance given above and the acetate of said compound.

5. The method which comprises reacting paraformaldehyde with alpha-methyl styrene in the presence of acetic acid and at a temperature of from 80° C. to 250° C., thereby to obtain both 3-phenyl-3-butenol-1 and the acetate of 3-phenyl-3-butenol-1.

6. The method which comprises reacting paraformaldehyde with alpha-methyl styrene at a temperature of from 80° C. to 250° C., thereby to obtain 3-phenyl-3-butenol-1.

7. The method which comprises reacting paraformaldehyde with 3,4-dichloro-alpha-methyl styrene in the presence of acetic acid and at a temperature of from 80° C. to 250° C., thereby to obtain both 3-(3,4-dichlorophenyl)-3-butenol-1 and the acetate of 3-(3,4-dichlorophenyl)-3-butenol-1.

8. The method which comprises reacting paraformaldehyde with 3,4-dichloro-alpha-methyl styrene at a temperature of from 80° C. to 250° C., thereby to obtain 3-(3,4-dichlorophenyl)-3-butenol-1.

9. The method which comprises reacting a member of the class consisting of formaldehyde and formaldehyde yielding substances with a compound of the formula

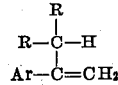

wherein Ar is an aromatic radical composed of a single ring structure and in which all the hydrogen atoms are attached to carbon atoms, and each R is selected from the class consisting of hydrogen and lower alkyl radicals, at a temperature of from about 80° C. to about 250° C., thereby to obtain a compound of the formula

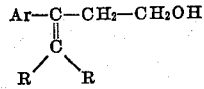

wherein Ar and R have the significance given above.

THOMAS R. STEADMAN.

References Cited in the file of this patent

UNITED STATES PATENTS

| Number | Name | Date |
|---|---|---|
| 2,307,894 | Mikeska | Jan. 12, 1943 |
| 2,308,192 | Mikeska | Jan. 12, 1943 |
| 2,418,290 | Bruson et al. | Apr. 1, 1947 |

OTHER REFERENCES

Prins, Chemical Abstracts, vol. 14, pages 1662–1663 (1920).

Walker, "Formaldehyde," American Chemical Society Monograph, Number 98 (1944), pages 227–229. Reinhold Publishing Corp., New York.